United States Patent
Braden et al.

(10) Patent No.: US 9,856,030 B2
(45) Date of Patent: Jan. 2, 2018

(54) ACOUSTIC ATTENUATION WITH ADAPTIVE IMPEDANCE

(71) Applicant: ROHR, INC., Chula Vista, CA (US)

(72) Inventors: Robert L. Braden, San Diego, CA (US); Teresa M. Kruckenberg, La Mesa, CA (US); Vijay V. Pujar, San Diego, CA (US); Hwa-Wan Kwan, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 463 days.

(21) Appl. No.: 14/554,933

(22) Filed: Nov. 26, 2014

(65) Prior Publication Data
US 2016/0146039 A1 May 26, 2016

(51) Int. Cl.
| | |
|---|---|
| *F02C 7/045* | (2006.01) |
| *H04R 23/00* | (2006.01) |
| *B64D 29/00* | (2006.01) |
| *G10K 11/178* | (2006.01) |
| *G10K 11/172* | (2006.01) |
| *H04R 1/28* | (2006.01) |
| *H04R 7/12* | (2006.01) |
| *H04R 31/00* | (2006.01) |

(52) U.S. Cl.
CPC .............. *B64D 29/00* (2013.01); *F02C 7/045* (2013.01); *G10K 11/172* (2013.01); *G10K 11/178* (2013.01); *H04R 23/002* (2013.01); *F05D 2250/283* (2013.01); *F05D 2260/962* (2013.01); *F05D 2260/963* (2013.01); *G10K 2210/1281* (2013.01); *G10K 2210/3212* (2013.01); *G10K 2210/3214* (2013.01); *G10K 2210/32271* (2013.01); *H04R 1/2811* (2013.01); *H04R 7/125* (2013.01); *H04R 31/006* (2013.01); *H04R 2307/023* (2013.01); *Y02T 50/671* (2013.01)

(58) Field of Classification Search
CPC ............. H04R 23/002; F05D 2260/962; F05D 2260/964; F02C 7/045; B64C 21/00
USPC .......................................... 181/292; 415/119
See application file for complete search history.

(56) References Cited

U.S. PATENT DOCUMENTS

| | | | | |
|---|---|---|---|---|
| 5,702,230 | A * | 12/1997 | Kraft ....................... | F01D 25/04 181/206 |
| 5,979,593 | A * | 11/1999 | Rice ........................ | F02C 7/045 181/207 |

(Continued)

OTHER PUBLICATIONS

Aliev et al., "Underwater Sound Generation Using Carbon Nanotube Projectors". Nano Letters, 2010, vol. 10, pp. 2374-2380.

(Continued)

*Primary Examiner* — Jeremy Luks
(74) *Attorney, Agent, or Firm* — Snell & Wilmer, L.L.P.

(57) ABSTRACT

An acoustic liner may include a core with a plurality of resonator chambers, a perforated top sheet coupled to the core, and a backskin coupled to the core. A thermoacoustic speaker including nanomaterials may be coupled to at least one of the core, the backskin, and the perforated top sheet. A voltage may be applied to the thermoacoustic speaker. The thermoacoustic carbon nanotube speaker may create a dynamic excitation within a resonator chamber in the core. The dynamic excitation may change the liner acoustic impedance to achieve optimum noise attenuation over a wide range of frequencies or engine operating conditions.

13 Claims, 4 Drawing Sheets

(56) References Cited

U.S. PATENT DOCUMENTS

| | | | | |
|---|---|---|---|---|
| 6,782,109 B2* | 8/2004 | Sheplak | ............... | G10K 11/172 |
| | | | | 381/152 |
| 7,970,148 B1* | 6/2011 | Remington | ............... | B64C 1/40 |
| | | | | 181/206 |
| 8,408,358 B1* | 4/2013 | Hermiller | ............... | F02K 1/827 |
| | | | | 181/229 |
| 2006/0169532 A1* | 8/2006 | Patrick | ................... | F02C 7/045 |
| | | | | 181/210 |
| 2009/0268556 A1 | 10/2009 | Jiang | | |
| 2010/0086150 A1* | 4/2010 | Jiang | ................... | H04R 23/002 |
| | | | | 381/164 |
| 2010/0166232 A1* | 7/2010 | Liu | ....................... | H04R 1/028 |
| | | | | 381/164 |
| 2010/0188934 A1 | 7/2010 | Qian | | |
| 2011/0096950 A1 | 4/2011 | Rougas | | |
| 2011/0110535 A1 | 5/2011 | Jiang | | |
| 2011/0158446 A1 | 6/2011 | Liu | | |
| 2011/0212535 A1 | 9/2011 | Kaul | | |
| 2015/0136909 A1* | 5/2015 | Kruckenberg | ........ | B64C 23/005 |
| | | | | 244/130 |

OTHER PUBLICATIONS

Garcia et al., "Fabrication of Composite Microstructures by Capillarity-driven Wetting of Aligned Carbon Nanotubes with polymers", Nanotechnology, vol. 18, Feb. 2007, pp. 1-11, IOP Publishing Ltd., UK.

* cited by examiner

ACOUSTIC ATTENUATION WITH ADAPTIVE IMPEDANCE

FIELD

The present disclosure relates to turbine engines and, more specifically, to an adaptive, honeycomb, acoustic liner for attenuating noise at different engine operating conditions in turbine engines.

BACKGROUND

Acoustic liners are commonly used on aircraft components to attenuate noise emissions. Such liners commonly comprise a non-perforated backskin, a honeycomb or other shape core, and a perforated top sheet. The core forms one or more resonator chambers which are open through the perforations in the top sheet.

Carbon nanotube thin films have been shown to have thermoacoustic capabilities. In response to an alternating current applied to a carbon nanotube film, the carbon nanotubes may rapidly heat up and cool down. This creates a thin thermoacoustic boundary layer of air pressure that creates sound waves.

SUMMARY

An acoustic liner may comprise a core comprising a resonator chamber. A perforated top sheet may be coupled to the core. A backskin may be coupled to the core. A thermoacoustic speaker comprising nanomaterials may be coupled to at least one of the core, the perforated top sheet, or the backskin.

In various embodiments, the nanomaterials may comprise at least one of carbon nanotubes, graphene nanoplatelets, or carbon nanofibers. An electrode may be coupled to the thermoacoustic speaker. The thermoacoustic speaker may be configured to generate a thermoacoustic pressure wave within the resonator chamber. The thermoacoustic speaker may comprise a preformed film comprising at least one of carbon nanotubes, graphene nanoplatelets, or carbon nanofibers. The thermoacoustic speaker may comprise a plurality of aligned carbon nanomaterials. The thermoacoustic speaker may comprise carbon nanotubes grown on a substrate. The thermoacoustic speaker may be coupled to the top sheet and comprise a plurality of perforations corresponding to the perforated top sheet.

A nacelle for an aircraft may comprise an acoustic liner configured to attenuate noise. The acoustic liner may comprise a core located between a top skin and a back skin. A thermoacoustic speaker comprising nanomaterials may be located within a cell of the core. The thermoacoustic speaker may be configured to modify an acoustic characteristic of the cell using the nanomaterials. The nanomaterials may comprise at least one of carbon nanotubes, graphene nanoplatelets, or carbon nanofibers. The thermoacoustic speaker may be coupled to the top skin. The thermoacoustic speaker may comprise a plurality of perforations. The acoustic panel may be configured to be tuned by modifying at least one of a frequency and an amplitude of an alternating current applied to the thermoacoustic speaker. The thermoacoustic speaker may comprise a carbon nanomaterial film coupled to the cell.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
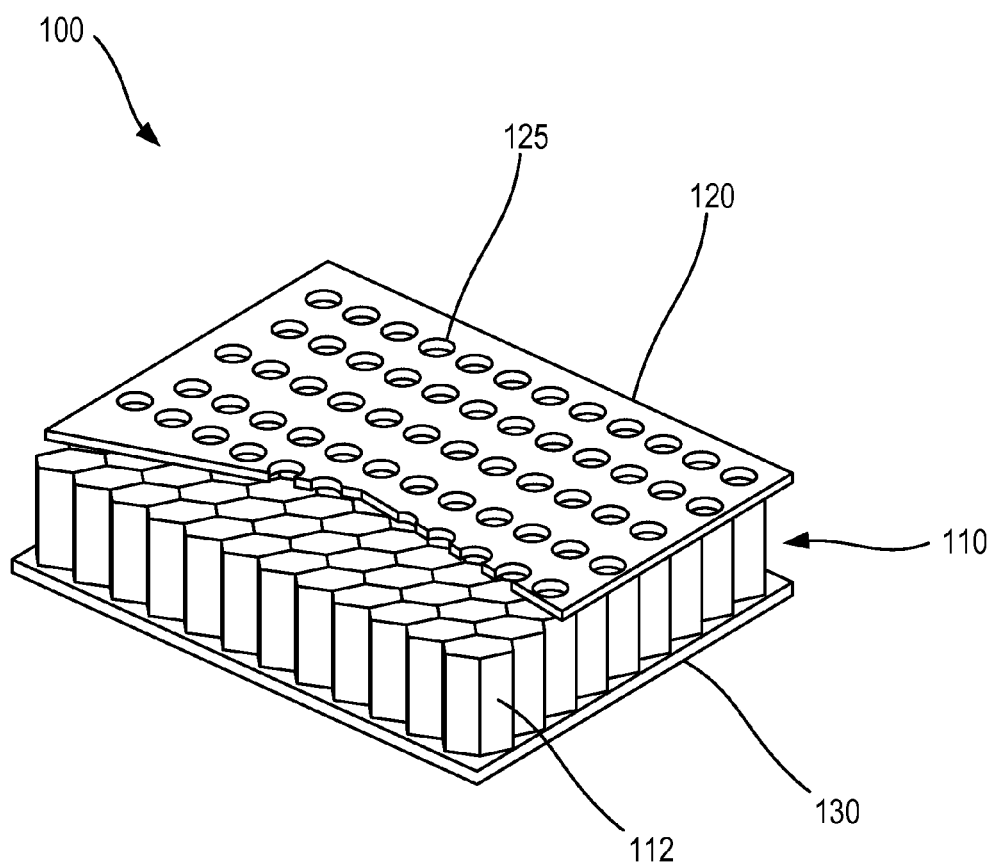
FIG. 1 illustrates a perspective view of an acoustic honeycomb structure in accordance with various embodiments.

Referring to FIG. 1, an acoustic honeycomb structure 100 is illustrated according to various embodiments. The acoustic honeycomb structure 100 may be an acoustic liner in a nacelle for an aircraft engine. The acoustic honeycomb structure 100 may comprise a core 110, positioned between a perforated top sheet 120 and a backskin 130. The core 110 may comprise a plurality of cells 112. The bottom of the acoustic honeycomb structure 100 may be closed by a generally rigid non-perforated plate referred to herein as the backskin 130. A perforated top sheet 120 having perforations 125 may be coupled to the top of the acoustic honeycomb structure 100. Additional layers may be formed on top of the perforated top sheet 120 for airflow and/or acoustic properties as desired. The perforated top sheet 120, core 110, and backskin 130 combine to form cells 112 that become resonator chambers and work to attenuate acoustic waves, such as noise from an aircraft engine, in a known fashion. The perforations 125 are configured to attenuate an engine's noise by directing the sound into the cells 112 of the acoustic honeycomb structure 100 to allow reflected noise to destructively interfere with and cancel source noise. The acoustic honeycomb structure 100 may attenuate sound waves at certain frequency ranges depending on the percent open area ("POA") and diameter of the perforations 125, the core height of the cells 112, the volume of the resonator chamber or cell 112, the thickness of the top skin, etc. In various embodiments, the acoustic honeycomb structure 100 may comprise one or more septum caps within the cells 112.

Figure 2:
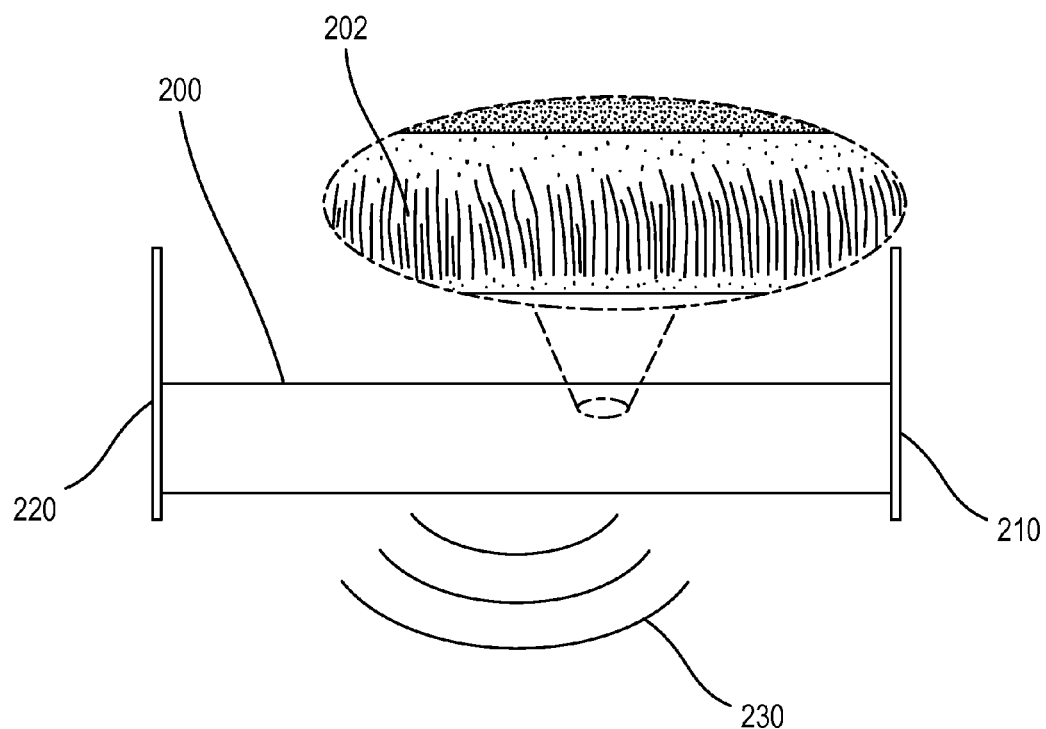
FIG. 2 illustrates a perspective view of a thermoacoustic carbon nanotube speaker in accordance with various embodiments.

Referring to FIG. 2, a thermoacoustic speaker 200 is illustrated according to various embodiments. The thermoacoustic speaker 200 may comprise nanomaterials. The nanomaterials may comprise at least one of carbon nanotubes, graphene nanoplatelets, or carbon nanofibers. In various embodiments, the thermoacoustic speaker 200 may comprise a plurality of aligned nanomaterials 202. Aligned nanomaterials refers to a plurality of nanomaterials in which at least 50% of the nanomaterials are substantially parallel. An alternating current may be applied to the thermoacoustic speaker 200 via a first electrode 210 and a second electrode 220. The alternating current may cause the aligned nanomaterials 202 to rapidly heat and cool. As the thermoacoustic speaker 200 heats and cools, the thermoacoustic speaker 200 may generate a thermally induced pressure gradient (or dynamic excitation) in the form of propagating sound waves 230. An example of thermoacoustic speakers comprising nanomaterials is disclosed in Jiang et al., U.S. Patent Publication No. 2011/0110535, the contents of which are incorporated by reference herein in their entirety.

Figure 3A:
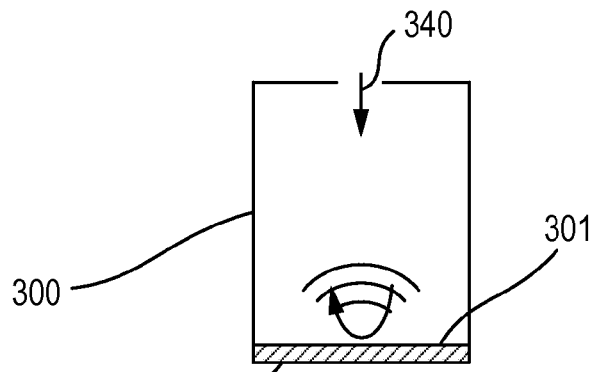
FIGS. 3A-3C illustrate a cross section view of a cell in an acoustic liner with carbon nanotubes in various locations in accordance with various embodiments.
Figure 3B:
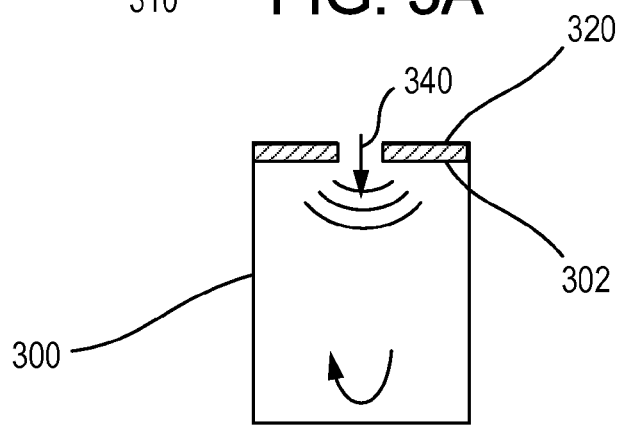
Figure 3C:
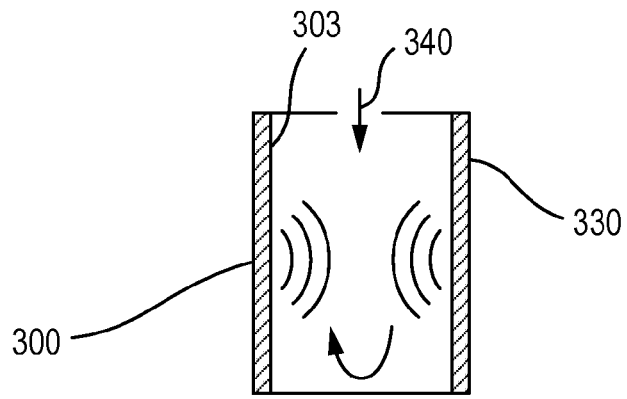

Referring to FIGS. 3A-3C a cross-section of a honeycomb cell 300 with a thermoacoustic speaker in various locations is illustrated according to various embodiments. In FIG. 3A, a thermoacoustic speaker 301 is illustrated coupled to a backskin 310 of the honeycomb cell 300. In FIG. 3B, a thermoacoustic speaker 302 is illustrated coupled to a perforated top sheet 320 of the honeycomb cell 300. In FIG. 3C, a thermoacoustic speaker 303 is illustrated coupled to cell walls 330 of the honeycomb cell 300.

The acoustic impedance of the honeycomb cell 300 may be changed by a dynamic excitation that is generated by the thermoacoustic speakers 301, 302, or 303 that are coupled to the backskin 310, the perforated top sheet 320, or the cell walls 330. The frequency, magnitude, and phase of the dynamic excitation may be modified to fit different operating conditions in order to achieve optimum noise attenuation over a wide range of frequencies.

The primary purpose of the honeycomb cell 300 is to mitigate engine noise via noise cancellation. As the sound enters the honeycomb cell 300 it is reflected back at 180 degrees out of phase with engine noise, effectively cancelling engine noise. The depth of the honeycomb cell 300 is tailored so that reflected noise exits the honeycomb cell 300 at 180 degree out of phase with anticipated peak frequencies. The depth of the honeycomb cell 300 can be tailored as needed to allow for optimum noise mitigation. Cells optimized for noise mitigation are often not optimum for weight and aerodynamic considerations. Weight considerations and aerodynamic profile seek to reduce the width of the acoustic treatment.

Pressure within the honeycomb cell 300 can affect the resonance time of noise reflections, thus affecting the phase mismatch with engine noise. This technology seeks to tailor the pressure within the honeycomb cell 300 to enable a physically shorter honeycomb cell 300 that is still optimized to mitigate engine noise.

When excited by electrical current, nanomaterials heat up. The nanomaterials quickly dissipate the heat into the surrounding air. With constant current the effect of this behavior is a rapid heating/cooling of the surrounding air which, in turn, causes regular and rapid pressure fluctuations. These pressure fluctuations effectively create a Helmholtz resonator from the surrounding air which emits sound waves. As they travel through the honeycomb cell 300 these waves affect the sound pressure within the honeycomb cell 300. The modified acoustic impedance may cause the honeycomb cell 300 to attenuate more noise when the frequency of the sound wave 340 is varied. Thus, a smaller acoustic liner may be utilized to decrease package size and weight without sacrificing noise attenuation. Additionally, the pressure gradient may be used to tune the honeycomb cell 300 to different frequencies. The honeycomb cell 300 may be tuned by increasing or decreasing the amplitude or frequency of the current applied to the thermoacoustic speakers 301, 302, 303. For example, during different periods of flight, such as takeoff or cruise, it may be desirable for the honeycomb cell 300 to target different frequencies based on the frequencies of sound waves being emitted by an engine at a particular time.

The thermoacoustic speakers 301, 302, 303 may be added to the honeycomb cell 300 via a variety of methods. In various embodiments, the thermoacoustic speakers 301, 302, 303 may be provided in a pre-grown flexible film of nanomaterials. The film may be bonded to the honeycomb cell 300. The film may be bonded to at least one of the backskin 310, the perforated top sheet 320, or the cell walls 330. A binder may bond the film to the honeycomb cell 300, as well as encapsulate the thermoacoustic speakers 301, 302, 303 and protect the thermoacoustic speakers from damage. In various embodiments, the film may be bonded to the top sheet prior to perforating the top sheet. Thus, the film may comprise perforations corresponding to perforations in the perforated top sheet. However, in various embodiments, the thermoacoustic speakers 301, 302, 303 may be nanomaterials grown on the backskin 310, the perforated top sheet 320, or the cell walls 330. Additionally, in various embodiments the thermoacoustic speakers 301, 302, 303 may be applied in an ink deposition process.

The combination of the thermoacoustic speaker thin films and the acoustic liner may produce an adaptive acoustic impedance liner, in which the liner impedance is actively controlled to achieve optimum values over a wide range of frequencies or engine operating conditions. This approach may not require an exact cancellation between the unwanted noise and the anti-phase secondary sound.

Figure 4:
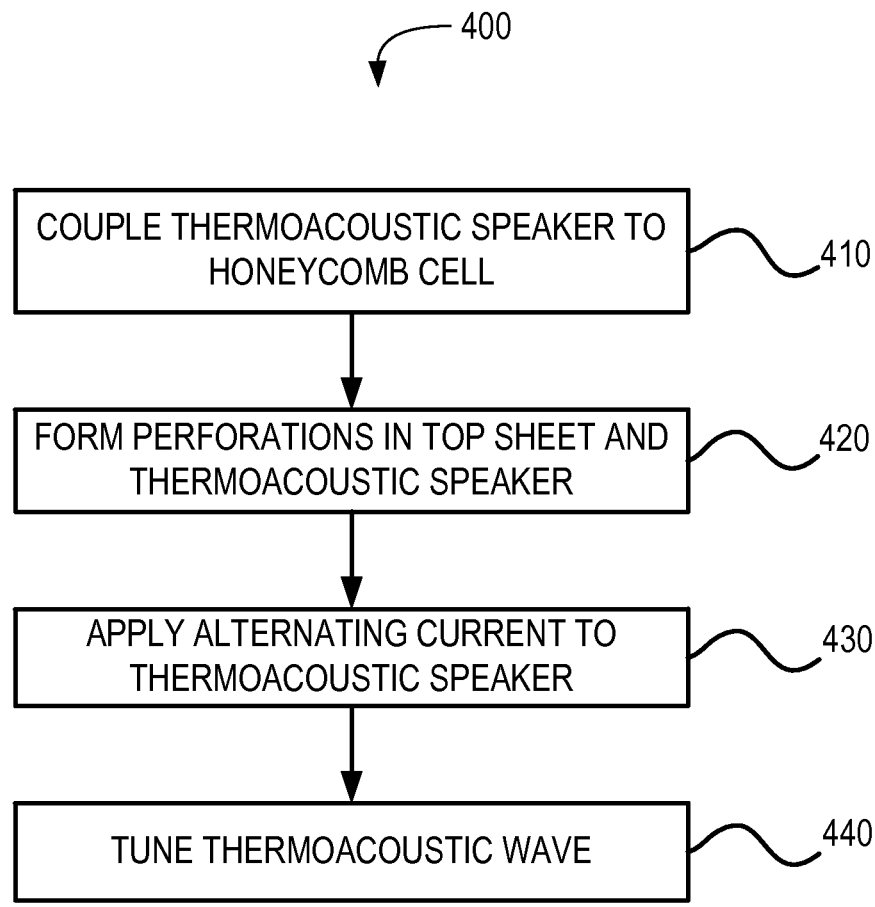
FIG. 4 illustrates a flowchart of a method for attenuating noise in an aircraft in accordance with various embodiments.

Referring to FIG. 4, a flowchart 400 of a process for decreasing noise in an aircraft is illustrated according to various embodiments. A thermoacoustic speaker may be coupled to a honeycomb cell (step 410). In various embodiments, the thermoacoustic speakers may comprise aligned nanomaterials. The thermoacoustic speaker may be coupled to a perforated sheet, a backskin, and/or a cell wall. The thermoacoustic speaker may be in a preformed film. However, in various embodiments the thermoacoustic speaker may comprise nanomaterials grown in situ on the honeycomb cell or deposited in an ink. In embodiments where the thermoacoustic speaker is coupled to the perforated sheet, a plurality of perforations may be formed in the perforated sheet and the thermoacoustic speaker (step 420). An alternating current may be applied to the thermoacoustic speaker (step 430). The alternating current may cause the thermoacoustic speaker to rapidly heat and cool. The rapid heating and cooling of the thermoacoustic speaker generates pressure waves or thermoacoustic waves. In various embodiments, changing the frequency or the peak voltage of the standard sinusoidal alternating current will change the resulting thermoacoustic wave. The thermoacoustic wave generated by the alternating current in the nanomaterials may be tuned to interact with the incoming sound wave within the honeycomb cell (step 440), and provide noise attenuation of a different frequency that is otherwise not possible for the honeycomb core-depth and volume.

While the noise attenuation systems described herein have been described in the context of aircraft applications, one will appreciate in light of the present disclosure that the system described herein may be used in connection with various other applications, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process which utilizes acoustic liners.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An acoustic liner comprising:
   a core comprising a resonator chamber;
   a perforated top sheet coupled to the core;
   a backskin coupled to the core; and
   a thermoacoustic speaker comprising nanomaterials, wherein the thermoacoustic speaker is coupled to, the perforated top sheet, wherein the thermoacoustic speaker comprises a plurality of perforations corresponding to the perforated top sheet.

2. The acoustic liner of claim 1, wherein the nanomaterials comprise at least one of carbon nanotubes, graphene nanoplatelets or carbon nanofibers.

3. The acoustic liner of claim 1, further comprising an electrode coupled to the thermoacoustic speaker.

4. The acoustic liner of claim 1, wherein the thermoacoustic speaker is configured to generate a thermoacoustic pressure wave within the resonator chamber.

5. The acoustic liner of claim 1, wherein the thermoacoustic speaker comprises a preformed film comprising at least one of carbon nanotubes, graphene nanoplatelets or carbon nanofibers.

6. The acoustic liner of claim 1, wherein the thermoacoustic speaker comprises a plurality of aligned carbon nanomaterials.

7. The acoustic liner of claim 1, wherein the thermoacoustic speaker comprises carbon nanotubes grown on a substrate.

8. The acoustic liner of claim 1, further comprising a binder encapsulating the nanomaterials.

9. A nacelle for an aircraft comprising an acoustic liner configured to attenuate noise, wherein the acoustic liner comprises:
   a core located between a perforated top skin and a backskin; and
   a thermoacoustic speaker comprising nanomaterials located within a cell of the core,
   wherein the thermoacoustic speaker is coupled to the top skin, and
   wherein the thermoacoustic speaker comprises a plurality of perforations corresponding to the perforated top skin.

10. The nacelle of claim 9, wherein the thermoacoustic speaker is configured to modify an acoustic characteristic of the cell using the carbon nanomaterials.

11. The nacelle of claim 9, wherein the nanomaterials comprise at least one of carbon nanotubes, graphene nanoplatelets or carbon nanofibers.

12. The nacelle of claim 9, wherein the acoustic liner is configured to be tuned by modifying at least one of a frequency and an amplitude of an alternating current applied to the thermoacoustic speaker.

13. The nacelle of claim 9, wherein the thermoacoustic speaker comprises a carbon nanomaterial film coupled to the cell.

* * * * *